June 17, 1930. A. DINA 1,765,006
SHUTTER FOR PROJECTION MACHINES [BENT EDGES] FOR
MOTION PICTURE PROJECTION MACHINES
Filed April 1, 1929
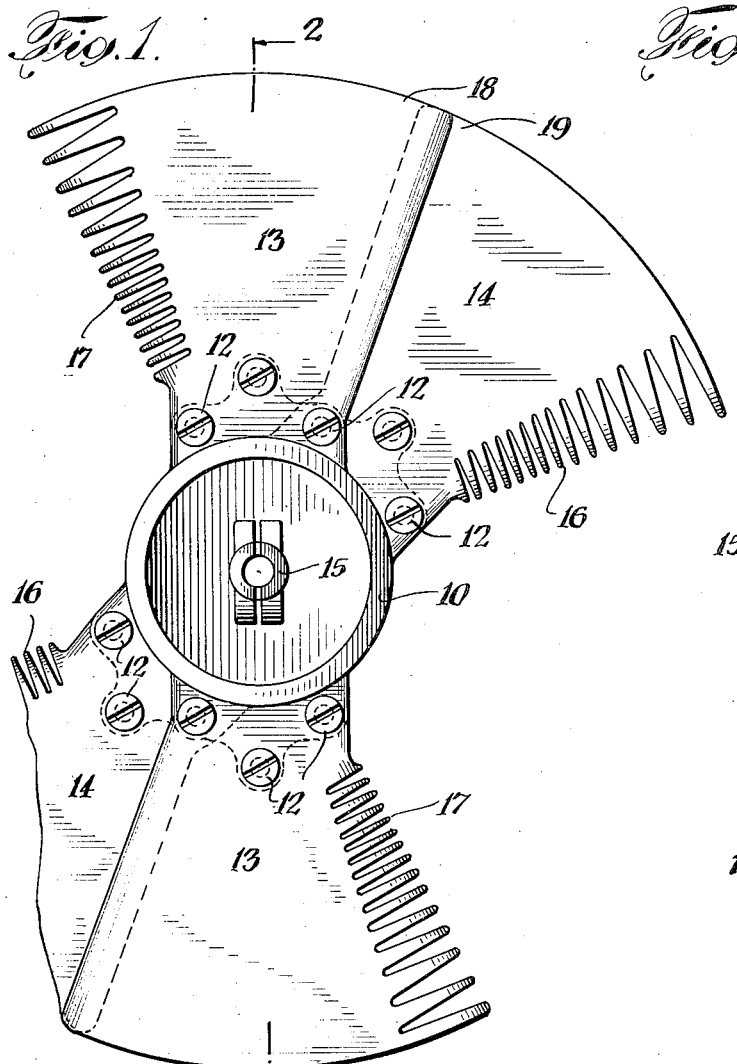
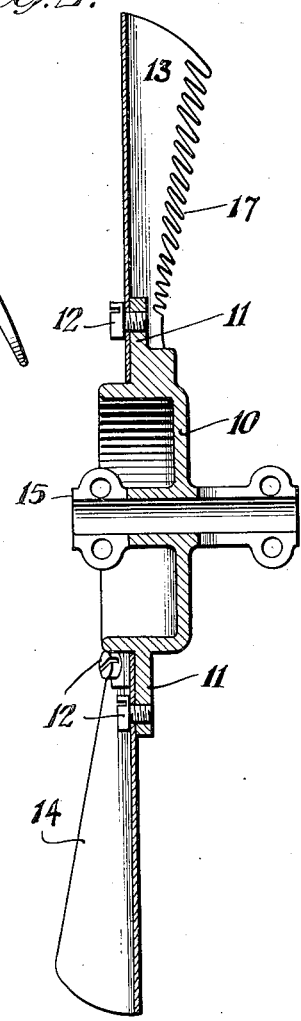
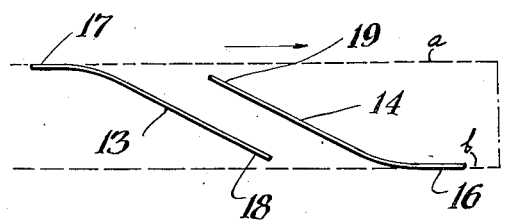
Inventor
Augusto Dina
By his Attorney Patented June 17, 1930

1,765,006

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

SHUTTER FOR PROJECTION MACHINES (BENT EDGES) FOR MOTION-PICTURE PROJECTION MACHINES

Application filed April 1, 1929. Serial No. 351,585.

This invention relates to projectors and especially to motion picture projectors and has particular reference to a new and useful improvement in shutters therefor.

One of the objects of the invention is to provide a simple, compact shutter, in the operation of which, the maximum amount of the projection light beam is allowed to fall upon the film, and in which the minimum amount of flickering occurs, and in which the film and the projection head are well ventilated and kept cool at all times.

Further and more specific objects, features, and advantages will more clearly appear from the detailed description given below taken in connection with the accompanying drawings which form part of the specification, which illustrate one embodiment of the invention, and in which, Fig. 1 is a partial elevation of the shutter showing at least one set of blades in their full operative relation, Fig. 2 is a vertical sectional view taken on the line 2—2 of Fig. 1, and, Fig. 3 is a plan view, in diagrammatic fashion, of the blades of one set, showing their angular disposition and relation.

In the present preferred form of the invention, the shutter is generally employed and disposed for effective operation to the rear of the projection head of the machine, and in this position it cuts across a tapering beam of light, the diameter of which decreases as the light approaches the film aperture opening in the projection head. The disposition of the shutter in this relation to the head causes an elimination of fading and flickering. The blades of the shutter are preferably twisted so that the shutter acts as a fan to throw air toward the head and the film to keep them cool. To provide the most effective angle and to cause the proper circulation of the air, the blades are arranged in sets of two which are spaced apart but having adjacent edges slightly overlapping as shown in Fig. 1. The forward edges and the trailing edges are combed to reduce the flickering and fading, and the blades are disposed at an angle to the plane normal to the axis of the shutter shaft. A single continuous blade may be employed as a substitute for the two-part blade if desired.

A blade which is disposed at an angle to a given plane of rotation but which itself is straight through its length, will take up a given amount of axial depth, as it might be called. Consequently, that blade can be moved only to a definite point near the head of the machine. However, if the leading and trailing edges of the blades or sets of blades are bent out of the plane of the rest of the blade and disposed in a plane normal to the axis of rotation, this will permit the blade to be disposed slightly nearer the film and the projection head without materially affecting the capacity of the blade to ventilate the film and the head.

By so moving the blade even slightly along the light beam nearer to the film, the diameter of the beam which is cut by the blades in their new position is a little smaller than before and it is obvious that the total width of each blade from leading edge to trailing edge to cover the beam may be made less than if the blades were cutting the beam at a plane of larger diameter. Therefore, since the angle covered by the blades is smaller, then the angle or distance between the blades must be larger than before and consequently the angle during which the light is allowed to pass between the blades is larger and the amount of light allowed to fall upon the head and the film is thereby increased and the light efficiency of the machine as a whole is greater without any material diminution of the cooling efficiency.

The above invention, as exemplified in the drawings, comprises a hub 10, on which blade anchor plates 11 are integrally formed, these plates having holes to receive small bolts 12 whereby the lower edges of the sets of blades 13 and 14 are anchored to the hub. The hub 10 is provided with a sleeve 15 whereby it may be slid on to a suitable shaft to rotate the shutter.

Each set of blades on the shutter comprises a pair of blades 13 and 14 and it will be seen that the leading edge 16 of each set is preferably of the "comb" construction to thereby eliminate flickering in so far as possible, and that the trailing edge 17 thereof is also combed and for the same reason. It is to be understood that the edges of the blades do not have to be combed to operate in accordance with this invention. The adjacent edges 18 and 19 of the blades are slightly overlapped to prevent passage of light therethrough and the blades, in respect to their main body portion, are disposed at an angle to the plane normal to the axis of rotation so as to produce the proper fan action and throw air toward the head and the film to keep them cool.

It will be particularly observed, however, that the leading and trailing edge portions of the blades are bent or twisted so that these bent edges lie in the said normal plane. Consequently it will be seen that the axial depth of the blade set (see distance a—b in Fig. 3) is less than it would be if the entire blade were straight and disposed at the angle in which the main portion of it lies. Therefore the shutter may be moved nearer to the film and into a portion of the beam of projection light of smaller diameter. This permits the total covering angle of each set to be reduced so that the angle between the edges 16 and 17 of a set of blades is less than it would normally be and the angle between the edges 16 and 17 of adjacent sets is larger than it would ordinarily be. This latter angle represents the angle or distance of the exposure opening of the shutter and since it is larger, the exposure time is larger and the amount of light utilized for projection increased without materially cutting down the cooling and ventilating qualities of the shutter.

Thus it will be apparent that the invention concerns a simple, compact, and effective shutter which cools the head and the film, reduces flickering, and is constructed so that the exposure angle thereof is increased to amplify the amount of light available for projection without detrimentally affecting the other characteristics of the shutter.

While the improvement has been described in detail and with respect to a preferred form thereof, it is not desired that it be limited to such details or form since many changes and modifications may be made and the invention embodied in other forms without departing from the spirit and scope of the invention in its broader aspects. Hence it is desired to cover all modifications and forms coming within the language or scope of any one or more of the appended claims.

What is claimed, is:

1. A shutter for projection machines comprising a plurality of sets of blades, the main body of the blades of each set being positioned at an angle to the plane normal to the axis of rotation, the leading and trailing portions of the edges of the sets of blades being disposed in planes normal to said axis 2. A shutter for projection machines comprising a blade having its main body portion twisted at an angle to the plane normal to the axis of rotation and its trailing and leading edges disposed in planes normal to said axis.

3. A shutter for projection machines comprising a blade having its main body portion twisted at an angle to the plane normal to the axis of rotation and its trailing edge portion disposed in a plane normal to said axis.

4. A shutter for projection machines comprising a blade having its main body portion twisted at an angle to the plane normal to the axis of rotation, one of the edge portions of said blade being combed to reduce flickering and also disposed in said normal plane to reduce the effective axial depth of the blade.

5. A shutter for projection machines comprising a blade having its main body portion twisted at an angle to the plane normal to the axis of rotation, a second blade disposed adjacent the first blade and with its main body portion disposed at the same angle, adjacent edges of the blades overlapping but spaced apart, the leading edge of one blade and the trailing edge of the other blade being combed, these leading and trailing edges being disposed in planes normal to said axis to reduce the effective depth of the blade.

6. A shutter for projection machines comprising a plurality of sets of blades spaced apart with their adjacent edges overlapping, the main body of the blades of each set being twisted at an angle to the plane normal to the axis of rotation, the leading edge portion of one blade and the trailing edge portion of the other blade of each set being disposed in planes normal to said axis.

7. A shutter for projection machines comprising a plurality of sets of blades spaced apart with their adjacent edges overlapping, the main body the blades of each set being twisted at an angle to the plane normal to the axis of rotation, the leading edge portion of one blade and the trailing edge portion of the other blade of each set being combed to reduce flickering and disposed in planes normal to said axis to decrease the effective axial depth of the shutter.

AUGUSTO DINA.